United States Patent
Natarajan et al.

(10) Patent No.: US 9,195,606 B2
(45) Date of Patent: Nov. 24, 2015

(54) DEAD BLOCK PREDICTORS FOR COOPERATIVE EXECUTION IN THE LAST LEVEL CACHE

(71) Applicant: Intel Corporation, Santa Clara, CA (US)

(72) Inventors: Ragavendra Natarajan, Mysore (IN); Jayesh Guar, Bangalore (IN); Nithiyanandan Bashyam, Bangalore (IN); Mainak Chaudhuri, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 13/976,248

(22) PCT Filed: Mar. 15, 2013

(86) PCT No.: PCT/US2013/032622
§ 371 (c)(1),
(2) Date: Jun. 26, 2013

(87) PCT Pub. No.: WO2014/143053
PCT Pub. Date: Sep. 18, 2014

(65) Prior Publication Data
US 2014/0351524 A1 Nov. 27, 2014

(51) Int. Cl.
*G06F 12/00* (2006.01)
*G06F 12/08* (2006.01)
(Continued)

(52) U.S. Cl.
CPC ........ *G06F 12/0891* (2013.01); *G06F 12/0804* (2013.01); *G06F 12/0842* (2013.01); *G06F 12/126* (2013.01); *G06F 12/128* (2013.01); *G06F 13/14* (2013.01); *G06F 12/084* (2013.01); *G06F 2212/62* (2013.01); *G06F 2212/69* (2013.01)

(58) Field of Classification Search
None
See application file for complete search history.

(56) References Cited

U.S. PATENT DOCUMENTS

| 6,237,065 B1 | 5/2001 | Banerjia et al. |
| 7,024,545 B1 | 4/2006 | Zuraski et al. |

(Continued)

FOREIGN PATENT DOCUMENTS

EP 1612683 A2 1/2006

OTHER PUBLICATIONS

Gaur, Jayesh, Chaudhur, Mainak, and Subramoney, Sreenivas, Bypass and Insertion Algorithms for Exclusive Last-Level Caches, ISCA '11 Proceedings of the 38th annual International Symposium on Computer Architecture, Jun. 2011, pp. 81-92, ACM New York, NY, USA 2011.

(Continued)

*Primary Examiner* — Farley Abad
*Assistant Examiner* — Richard B Franklin
(74) *Attorney, Agent, or Firm* — Trop, Pruner & Hu, P.C.

(57) ABSTRACT

A cache memory eviction method includes maintaining thread-aware cache access data per cache block in a cache memory, wherein the cache access data is indicative of a number of times a cache block is accessed by a first thread, associating a cache block with one of a plurality of bins based on cache access data values of the cache block, and selecting a cache block to evict from a plurality of cache block candidates based, at least in part, upon the bins with which the cache block candidates are associated.

20 Claims, 9 Drawing Sheets

(51) Int. Cl.
    *G06F 13/14* (2006.01)
    *G06F 12/12* (2006.01)

(56) References Cited

U.S. PATENT DOCUMENTS

| | | |
|---|---|---|
| 7,039,765 B1 * | 5/2006 | Wilkes ............................ 711/133 |
| 8,046,538 B1 | 10/2011 | Stenstrom |
| 8,065,487 B2 * | 11/2011 | Kornegay et al. ............. 711/133 |
| 8,407,421 B2 | 3/2013 | Steely, Jr. |
| 2004/0221110 A1 | 11/2004 | Rowlands et al. |
| 2006/0064549 A1 | 3/2006 | Wintergerst |
| 2006/0123405 A1 | 6/2006 | O'Brien et al. |
| 2010/0011198 A1 | 1/2010 | Hooker et al. |
| 2010/0064123 A1 | 3/2010 | Zuraski, Jr. et al. |
| 2010/0080221 A1 | 4/2010 | Beatini et al. |
| 2010/0153649 A1 | 6/2010 | Li et al. |
| 2011/0087845 A1 | 4/2011 | Burger et al. |
| 2011/0145501 A1 | 6/2011 | Steely, Jr. et al. |
| 2012/0170654 A1 | 7/2012 | Zhang et al. |
| 2012/0254550 A1 | 10/2012 | Gaur et al. |
| 2013/0151779 A1 | 6/2013 | Daly et al. |
| 2013/0151780 A1 | 6/2013 | Daly et al. |
| 2014/0032848 A1 * | 1/2014 | Zhao et al. ..................... 711/130 |
| 2014/0189305 A1 * | 7/2014 | Hickmann ..................... 712/205 |
| 2014/0281610 A1 * | 9/2014 | Biswas et al. ................. 713/322 |

OTHER PUBLICATIONS

International Search Report and Written Opinion, International Patent No. PCT/US2013/032622, mailed Dec. 26, 2013, 12 pages.

\* cited by examiner

| INCIDENT | TAG / ADDRESS | BIN (UC, TC) | TOD (0,0) LIVE | TOD(0,0) DEAD | ... | TOD (N,M) LIVE |
|---|---|---|---|---|---|---|
|  |  |  |  |  |  |  |
| 1 |  | (2,1) | 75 |  |  |  |
| 2 |  | (1,1) | 200 |  |  |  |
| 3 |  | (1,2) | 40 |  |  |  |
| 4 |  | (1,0) | 60 |  |  |  |
| 5 |  | (0,1) | 10 |  |  |  |
| 6 |  |  |  |  |  |  |
| 7 |  |  |  |  |  |  |
|  |  |  |  |  |  |  |

| BIN | LIVE BLOCK COUNT | DEAD BLOCK COUNT |
|---|---|---|
|  |  |  |
| (1,1) | 11 | 38 |
| (1,2) | 7 | 22 |
|  |  |  |
| (2,1) | 20 | 42 |
|  |  |  |
| (N,M) | 7 | 7 |

MAINTAIN A LLC EVICTION POLICY BASED, AT LEAST IN PART, ON A RELATIONSHIP BETWEEN (UC, TC) VALUES AND EVICTIONS
610

ASSIGN HIGHER PRIORITY TO SHARED BLOCKS THAN PRIVATE BLOCKS
620

CHOOSE LLC EVICTION VICTIMS USING THE EVICTION POLICY
630

MAKE DECISIONS FOR PRIVATE BLOCKS USING THREAD AWARE DEAD BLOCK PREDICTORS
640

FIG. 6

DEAD BLOCK PREDICTORS FOR COOPERATIVE EXECUTION IN THE LAST LEVEL CACHE

TECHNICAL FIELD

Embodiments described herein generally relate to the field of microprocessors and, more particularly, microprocessor cache memory policies for evicting cache lines.

BACKGROUND

Multicore processors and multi-threaded, cooperative workloads may exhibit cache access patterns that differ from cache access characteristics of single threaded execution environments. Methods for identifying dead blocks in a single core processor, however, may not extend well to a multicore environment.

BRIEF DESCRIPTION OF THE DRAWINGS

FIG. 4 illustrates a dead block database used in conjunction with at least one embodiment;

FIG. 6 illustrates one embodiment of a cache method; and

DESCRIPTION OF EMBODIMENTS

Figure 1A:
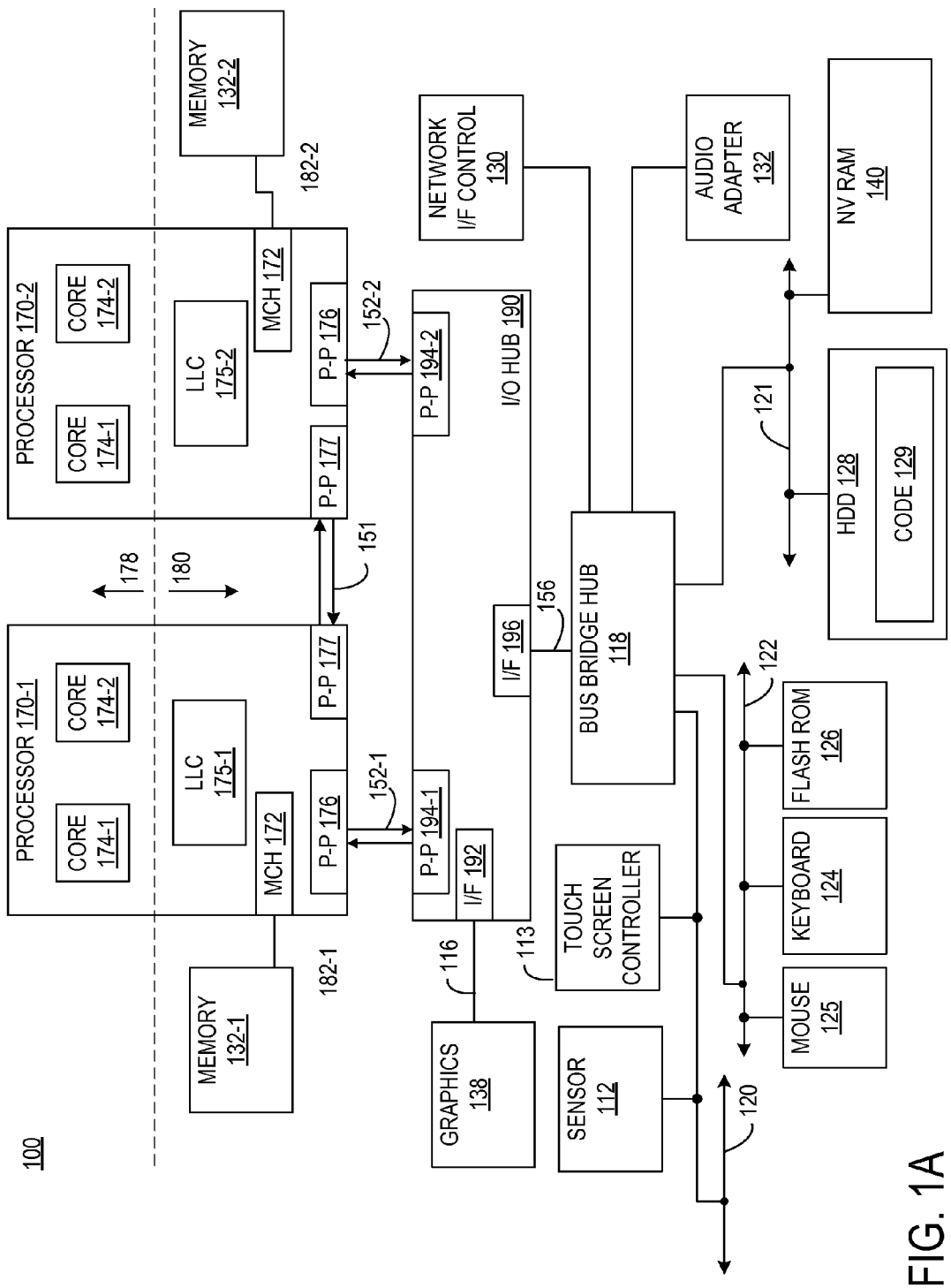
FIGS. 1A and 1B illustrate a multi-processor system used in conjunction with at least one embodiment.

Some embodiments pertain to the use of a thread-aware dead block predictor (TA-DBP) in a shared cache memory. In at least one embodiment, a method for predicting dead blocks recognizes distinctions between shared data and unshared data. In at least one embodiment, a replacement policy emphasizes the replacement of cache lines, referred to herein simply as blocks, representing unshared data and preferentially preserves shared data blocks.

In some embodiments, a TA-DBP algorithm classifies cache blocks in a core cache or private cache using a pair of parameters referred to herein as use count (UC) and trip count (TC) values. In at least one embodiment, the UC parameter for a cache block indicates the number of hits seen by the cache block while it resides in the core cache. In at least one embodiment, the TC parameter indicates the number of times the block was recalled from a higher level cache, referred to herein as the shared cache, to the core cache.

In at least one embodiment, a multi-core processor is operated according to a not recently used (NRU) replacement policy, pseudo-NRU policy, a not recently filled (NRF) policy, or another suitable replacement policy, and dead block counts and live block counts are maintained for each (UC, TC) pair. Some embodiments increment a dead block count associated with a (UC, TC) pair when a (UC, TC) cache block, i.e., a cache having the applicable values of UC and TC, is evicted from the shared cache. In these embodiments, all other instances of blocks possessing the (UC, TC) values represent live blocks. After sufficient dead block and live block data per tuple has been gathered, embodiments may access, review, or analyze the dead block data and live block data to identify any correlation or other relationship between dead blocks and live blocks. In at least one embodiment, dead block predictions may be based at least in part on any correlation or relationship identified. These dead block predictions may be used, in some embodiments, to prioritize eviction policies. In at least one embodiment, dead block predictions influence eviction policy by determining an age attribute when a block is allocated in the shared cache and leveraging an existing recency-based protocol to make the final eviction determination.

In at least one embodiment, access patterns associated with any data identified as being shared data, i.e., data accessed by two or more threads of the multicore processor during the cache memory life cycle of the data, are excluded or segregated from access patterns associated with unshared data. These embodiments are referred to herein as thread-aware embodiments. The cache memory lifecycle, also sometimes referred to herein as a cache memory tenure, refers to the interval when the cache block is first filled in one of the caches from memory until the time the block is evicted from the shared cache. During the cache memory lifecycle, a block may move between the shared cache and one or more core data caches. Death predictions may be made each time a block is allocated in the shared cache by examining the dead and live block counters of the (TC, UC) bin to which an unshared block is categorized. In at least one embodiment, dead and live block counters for various (TC, UC) tuples may be maintained for each core separately.

In at least one embodiment, a processor includes a plurality of processing cores and a cache memory subsystem. In at least one embodiment, the cache memory subsystem includes a plurality of core caches, where each of the core caches corresponds to one of the processing cores. The cache memory subsystem may further include a shared cache common to each of the processing cores. The cache memory subsystem, in at least one embodiment, includes TC logic and UC logic. The TC logic may increment a thread-aware TC for a block recalled from the shared cache to the first core cache. The UC logic may increment a UC for a block responsive to each access of the block in the first core cache. In at least one embodiment, the cache memory subsystem includes shared block logic to set a shared block bit for a block accessed by multiple core caches. Bin logic within the cache memory subsystem may maintain live block counts and dead block counts for each bin. In at least one embodiment, a bin corresponds to a (UC, TC) pair. The live block count may indicate the number of valid, unshared blocks associated with the corresponding bin. The dead block count may indicate the number of blocks evicted from a corresponding bin. In at least one embodiment, the cache memory subsystem may include eviction logic to select a shared cache block to evict from a plurality of eviction candidates, based on at least one of: TC values, live block counts, and dead block counts.

In some embodiments, the bin logic increments a live block count for a first bin and decrements a live block count for a second bin when it detects a (UC, TC) pair changing from a first combination to a second combination. The bin logic may further increment a dead block count for a third bin when an eviction of a cache block associated with the third bin is detected.

In some embodiments, the cache memory subsystem may include last-to-allocate (LTA) logic to set LTA bits for a block to indicate the last thread to allocate the block in the shared cache. In at least one embodiment, the LTA field identifies the first thread as the last thread to allocate the block. The shared block logic may set a shared block bit responsive to detecting that the LTA field identifies a second thread when the first thread has most recently allocated the block. In at least one embodiment, the cache memory subsystem includes age logic to set the maximum value for an age field of a block in response to setting the shared block bit for that block so that shared blocks are preferentially maintained in the shared cache with respect to unshared or private blocks. In some embodiments, the selection of a block to evict may include consideration of the age field.

In at least one embodiment, a cache memory eviction method includes maintaining thread-aware cache access data per cache block in a cache memory. The cache access data may be indicative of a number of times the cache block is accessed by a first thread. In some embodiments, access by a first thread corresponds to access by a first core cache. In at least one embodiment, the cache memory eviction method includes associating a cache block with one of many cache access bins, referred to herein as bins, based on cache access data values applicable to the cache block. In some embodiments, the cache memory eviction method includes selecting a cache block to evict from multiple candidates based at least in part upon the cache access bins in which a cache block candidate resides.

In some embodiments, the cache memory includes a shared cache within a cache memory hierarchy. The cache access data may include TC data indicating the number of times a block is forwarded from a shared cache to a first core cache. In some embodiments, the cache access data may also include UC data indicating the number of times a block is accessed by a first thread while residing in the first core cache. In some embodiments, the cache access bins that are maintained include a bin for each unique (UC, TC) pair. In some embodiments, the method includes maintaining a database of live block counts and dead block counts for each bin. In these embodiments, selecting the cache block to evict may be based at least in part upon a live block count and a dead block count for the particular cache access. In some embodiments, the method may further include maintaining a shared block status per cache block, where the shared block status indicates whether a second thread has access to the cache block. In these embodiments, the method may further include excluding shared cache blocks from the cache access to bins once a block is identified as a shared cache block. In these embodiments, the method may include excluding, from the live and dead block counts, shared cache blocks. In these embodiments, the selection of a cache block to evict may exclude from consideration any cache block candidate that is a shared block. In at least one embodiment, maintaining shared blocks status includes maintaining LTA data indicating the last thread to allocate a block. By maintaining LTA data, embodiments of the method may include, as shared blocks, blocks that are accessed by multiple threads, but which are never valid in multiple cores at any point in time. In addition to these one-at-a-time shared blocks, the shared blocks may include any blocks that have a shared block status under the MESI protocol or any other shared coherency status. In some embodiments, detection of a shared block is translated into an eviction policy preference by assigning the shared block a maximum age.

In these embodiments, the age field may be used to arbitrate between two candidates sharing common thread-aware block prediction data characteristics.

In at least one embodiment, a computer system includes a processor with a core region that has a plurality of processing cores; where each processing core includes a core cache and the processor as a whole includes a shared cache that is shared among the core cache. A memory controller is integrated into a non-core region of the processor and an I/O hub is connected to the processor in some embodiments. In at least one embodiment, the processor may include dead block prediction logic to maintain shared block data indicating when a block is shared, maintain cache access data indicating how many times an unshared block is accessed, associate unshared blocks with cache access bins based on the cache access data applicable to a block, maintain live block counts for each cache accessibility, and select blocks to evict based on the cache access data, the live block counts, and the dead block counts. In at least one embodiment, the shared cache is a set associative, multiple way cache, and the selection of any blocks to evict includes selecting the block to evict from the group of blocks that share the same set.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Figure 1B:
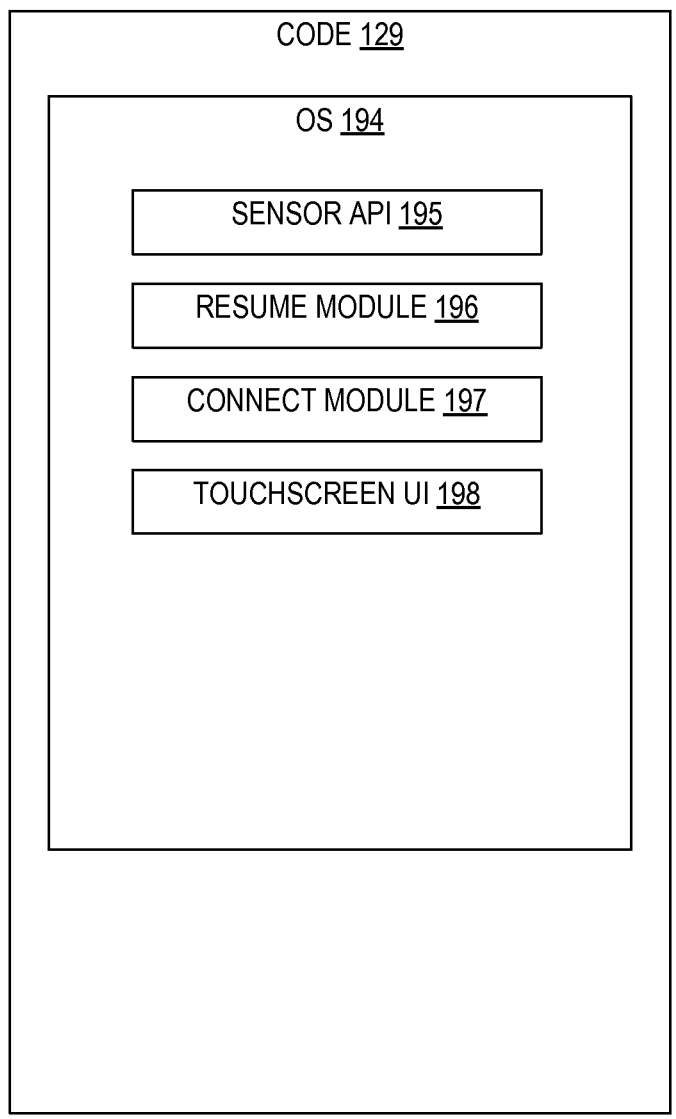

Embodiments may be implemented in many different system types and platforms. FIGS. 1A and 1B illustrate a multi-processor system used in conjunction with at least one embodiment. In at least one embodiment, system 100 is a multi-processor system that include a first processor 170-1 and a second processor 170-2. Although some embodiments include two processors 170, other embodiments may include more or fewer processors. In at least one embodiment, processors 170 include a core region 178 and an integration region 180. In some embodiments, core region 178 includes one or more processing cores 174. In some embodiments, integration region 180 includes a memory controller hub (MCH) 172, a shared cache 175, sometimes referred to as a last level cache (LLC) 175, a processor-hub point-to-point interface 176, and a processor-processor point-to-point interface 177.

In at least one embodiment, processing cores 174 may each include hardware and firmware resources (not depicted) to support an execution pipeline. In some embodiments, these resources may include a cache memory hierarchy, which may include a dedicated level one (L1) instruction cache, a dedicated L1 data cache, a level 2 (L2) data/instruction cache, or a combination thereof, prefetch logic and buffers, branch prediction logic, decode logic, a register file, various parallel execution resources including arithmetic logic units, floating point units, load/store units, address generation units, a data cache, and so forth.

In at least one embodiment, MCH 172 supports bidirectional transfer of data between a processor 170 and a system memory 132 via a memory interconnect 182. In some embodiments, system memory 132 may be a double-data rate (DDR) type dynamic random-access memory (DRAM) while memory interconnect 182 and MCH 172 may comply with a DDR interface specification. In some embodiments, system memory 132-1 may represent a bank of memory interfaces (or slots) that may be populated with corresponding memory circuits for a desired DRAM capacity.

In some embodiments, each processor 170 includes an MCH 172 to communicate with a portion of system memory 132 that is local to processor 170. In at least one embodiment, system memory 132-1 is local to processor 170-1 and represents a portion of the system memory 132 as a whole. In at least one embodiment, system 100 is a distributed memory multi-processor system in which each processor 170 can access each portion of system memory 132, whether local or not. While local accesses may have lower latency, accesses to non-local portions of system memory 132 are permitted in some embodiments.

In at least one embodiment, each processor 170 also includes a point-to-point interface 177 that supports communication of information with a point-to-point interface 177 of one of the other processors 170 via an inter-processor point-to-point interconnection 151. In some embodiments, processor-hub point-to-point interconnections 152 and processor-processor point-to-point interconnections 151 are distinct instances of a common set of interconnections. In other embodiments, point-to-point interconnections 152 may differ from point-to-point interconnections 151.

In some embodiments, processors 170 include point-to-point interfaces 176 to communicate via point-to-point interconnect 152 with a point-to-point interface 194 of an I/O hub 190. In at least one embodiment, I/O hub 190 includes a graphics interface 192 to support bidirectional communication of data with a graphics adapter 138 via a graphics interconnection 116, which may be implemented as a high speed serial bus, e.g., a peripheral components interface express (PCIe) bus or another suitable bus.

In some embodiments, I/O hub 190 also communicates, via an interface 196 and a corresponding interconnection 156, with a bus bridge hub 118 that supports various bus protocols for different types of I/O devices or peripheral devices. In at least one embodiment, bus bridge hub 118 supports a network interface controller (NIC) 130 that implements a packet-switched network communication protocol (e.g., Gigabit Ethernet), a sound card or audio adapter 133, and a low bandwidth bus 122 (e.g., low pin count (LPC), I2C, Industry Standard Architecture (ISA)), to support legacy interfaces referred to herein as desktop 110 interfaces that might include interfaces for a keyboard, mouse, serial port, parallel port, and a removable media drive. In some embodiments, low bandwidth bus 122 further includes an interface for a nonvolatile memory (NVM) device such as flash read only memory (ROM) 126, and other low bandwidth I/O devices (e.g., keyboard 124, mouse 125), and a storage protocol bus 121 (e.g., serial AT attachment (SATA), small computer system interface (SCSI)), to support persistent storage devices including conventional magnetic core hard disk drive (HDD) 128. In some embodiments, HDD 128 is illustrated as including store code 129, which may represent processor executable instructions including operating system instructions, application program instructions, and so forth, that, when executed by the processor, cause the processor to perform operations illustrated herein.

In at least one embodiment, system 100 also includes a non-volatile random access memory (NVRAM) 140, which may include a solid state drive, a phase change RAM, or another suitable device, and a peripheral bus 120 (e.g., USB, I2C, PCI, PCIe, Bluetooth) to support various peripheral devices including a sensor 112 and a touchscreen controller 113. Although specific instances of communication busses and bus targets have been illustrated and described, other embodiments may employ different communication busses and different target devices.

In some embodiments, system 100 includes an operating system 198 that may be entirely or partially stored in HDD 128. In some embodiments, operating system 140 may include various modules, application programming interfaces, and the like that expose to varying degrees various hardware and software features of system 100. In at least one embodiment, system 100 includes a sensor application programming interface (API) 142, a resume module 144, a connect module 146, and a touchscreen user interface 148.

In some embodiments, sensor API 142 provides application program access to one or more sensors (not depicted) that may be included in system 100. In some embodiments, sensors that system 100 might have include an accelerometer, a global positioning system (GPS) device, a gyro meter, an inclinometer, and an ambient light sensor. In at least one embodiment, resume module 144 may be implemented as software that, when executed, performs operations for reducing latency when transitioning system 100 from a power conservation state to an operating state. Resume module 144 may, in some embodiments, work in conjunction with the solid state drive (SSD) 150 to reduce the amount of SSD storage required when system 100 enters a power conservation mode. Resume module 144 may, in some embodiments, flush standby and temporary memory pages before transitioning to a sleep mode. In some embodiments, by reducing the amount of system memory space that system 100 is required to preserve upon entering a low power state, resume module 144 beneficially reduces the amount of time required to perform the transition from the low power state to an operating state. In some embodiments, connect module 146 may include software instructions that, when executed, perform complementary functions for conserving power while reducing the amount of latency or delay associated with traditional "wake up" sequences. In some embodiments, connect module 146 may periodically update certain "dynamic" applications including email and social network applications, so that, when system 100 wakes from a low power mode, the applications that are often most likely to require refreshing are up to date. In at least one embodiment, touchscreen user interface 148 supports a touchscreen controller 114 that enables user input via touchscreens traditionally reserved for hand-held applications. In at least one embodiment, the inclusion of touchscreen support in conjunction with support for communication devices enable system 100 to provide features traditionally found in dedicated tablet devices as well as features found in dedicated laptop and desktop type systems.

Figure 2A:
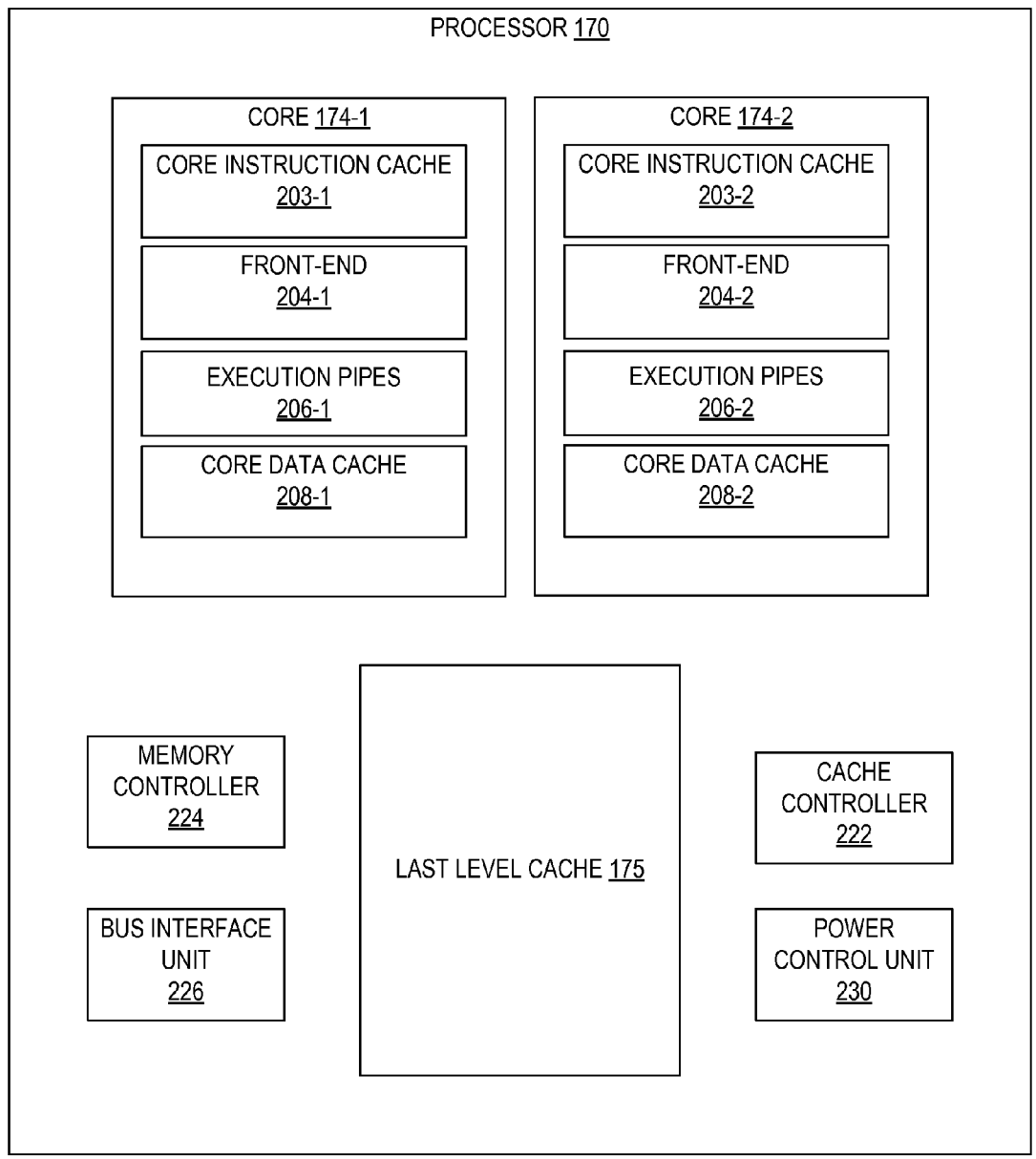
FIG. 2A illustrates a processor used in conjunction with at least one embodiment.

FIG. 2A illustrates a processor used in conjunction with at least one embodiment. In at least one embodiment, processor 170 includes a core region 178 and an integration region 180. In some embodiments, core region 178 includes processing cores 174-1 and 174-2. Other embodiments of processor 170 may include more or fewer processing cores 174.

In at least one embodiment, processing cores 174 include a core instruction cache 203, a front-end 204, execution pipes 206, and a core data cache 208. In some embodiments, front-end 204 monitors an instruction pointer and, based on predictions regarding program flow, fetches or prefetches instructions from core instruction cache 203 and issues instructions to execution pipes 206. In some embodiments, execution pipes 206 include multiple parallel pipelines including one or more floating point pipelines, one or more integer arithmetic logic unit pipelines, one or more branch pipelines, and one or more memory access pipelines, also referred to herein as load/store pipelines. In some embodiments, execution pipes 206 decode instructions, retrieve operands required to perform instructions, and may generate micro code to process the instructions from core instruction cache 203, may route the instructions through the appropriate execution pipeline, and may store any results. In at least one embodiment, execution pipes 206 include a register file that may support register renaming, speculative execution, and out-of-order execution of instructions.

In some embodiments, integration region 180 includes an LLC 175 and cache control logic 222. In this embodiment, LLC 175 is a shared cache that is shared among all of processing cores 174 of processor 170. In some embodiments, as suggested by its name, LLC 175 represents, from the perspective of processor 170, the last available hierarchical tier of cache memory. In at least one embodiment, if a memory access instruction that is presented to LLC 175 generates a cache miss, the requested data must be retrieved from system memory 132.

In at least one embodiment, processing core 174 and/or integration region 180 may include one or more levels of a cache hierarchy between core caches 203, 208 and LLC 175. In at least one embodiment, processing core 174 includes a cache memory intermediate between core caches 203, 208 and LLC 175. Processing core 174 may include, in some embodiments, an intermediate tier cache memory (not shown) hierarchically located between core caches 203, 208 and LLC 175. In at least one embodiment, each of the cache memories of processing core 174 may have a unique architectural configuration. In at least one embodiment, core data cache 208 and LLC 175 are both multiple-way, set associative caches. In some embodiments, LLC 175 is inclusive with respect to core data cache 208 while, in other embodiments, LLC 175 may be non-inclusive with respect to core data cache 208.

In some embodiments, cache control logic 222 controls access to the cache memories, enforces a coherency policy, implements a replacement policy, and monitors memory access requests from external agents, e.g., other processors 170 or I/O devices. In at least one embodiment, LLC 175 and core caches 203, 208 comply with an MESI protocol or a modified MESI protocol. The four states of the MESI protocol are described in Table 1.

TABLE 1

Description of Cache Block States in the MESI Protocol

| MESI State | Description |
| --- | --- |
| MODIFIED | The cache block contains valid data that is modified from the system memory copy of the data. Also referred to as a 'dirty' block. |
| EXCLUSIVE | The block contains valid data that is the same as the system memory copy of the data. Also indicates that no other cache has a block allocated to this same system memory address. Also referred to as a 'clean' block. |
| SHARED | The block contains valid and clean data, but one or more other caches have a block allocated to this same system memory address. |
| INVALID | The block is not currently allocated and is available for storing a new entry. |

A modified MESI protocol could include, in some embodiments, an additional state, the "F" state, identifying one of a plurality of "S" state lines, where the "F" state block is designated as the block to forward the applicable data should an additional request for the data be received, e.g., from a processor that does not have the data.

In at least one embodiment, integration region 180 of processor 170 also includes power management unit 230 to control power provided to the various resources of processor 170. In some embodiments, power management unit 230 provides unique power supply levels to core region 178 and integration region 180. In other embodiments, power management unit 230 may be further operable to provide unique power supply levels to each processing core 174 and/or provide clock signals at unique frequencies to processing cores 174. In addition, in some embodiments, power management unit 230 may implement various power states for processor 170 and define events that produce power state transitions.

In some embodiments, integration region 180 includes graphics accelerator 173 to support low latency, high bandwidth communication with a display device (not depicted). In at least one embodiment, graphics accelerator 173 may be integrated into processor 170 which represents an alternative to embodiments in which communication with graphics adapter 138 is implemented in the I/O hub 190.

In at least one embodiment, integration region 180 includes an I/O interface 188 to support communication with one or more chipset devices, discreet bus interfaces, and/or individual I/O devices. In some embodiments, I/O interface 188 provides one or more point-to-point interfaces such as interfaces 176 and 177. In other embodiments, I/O interface 188 may provide an interface to a shared bus to which one or more other processors 170 may also connect.

Figure 2B:
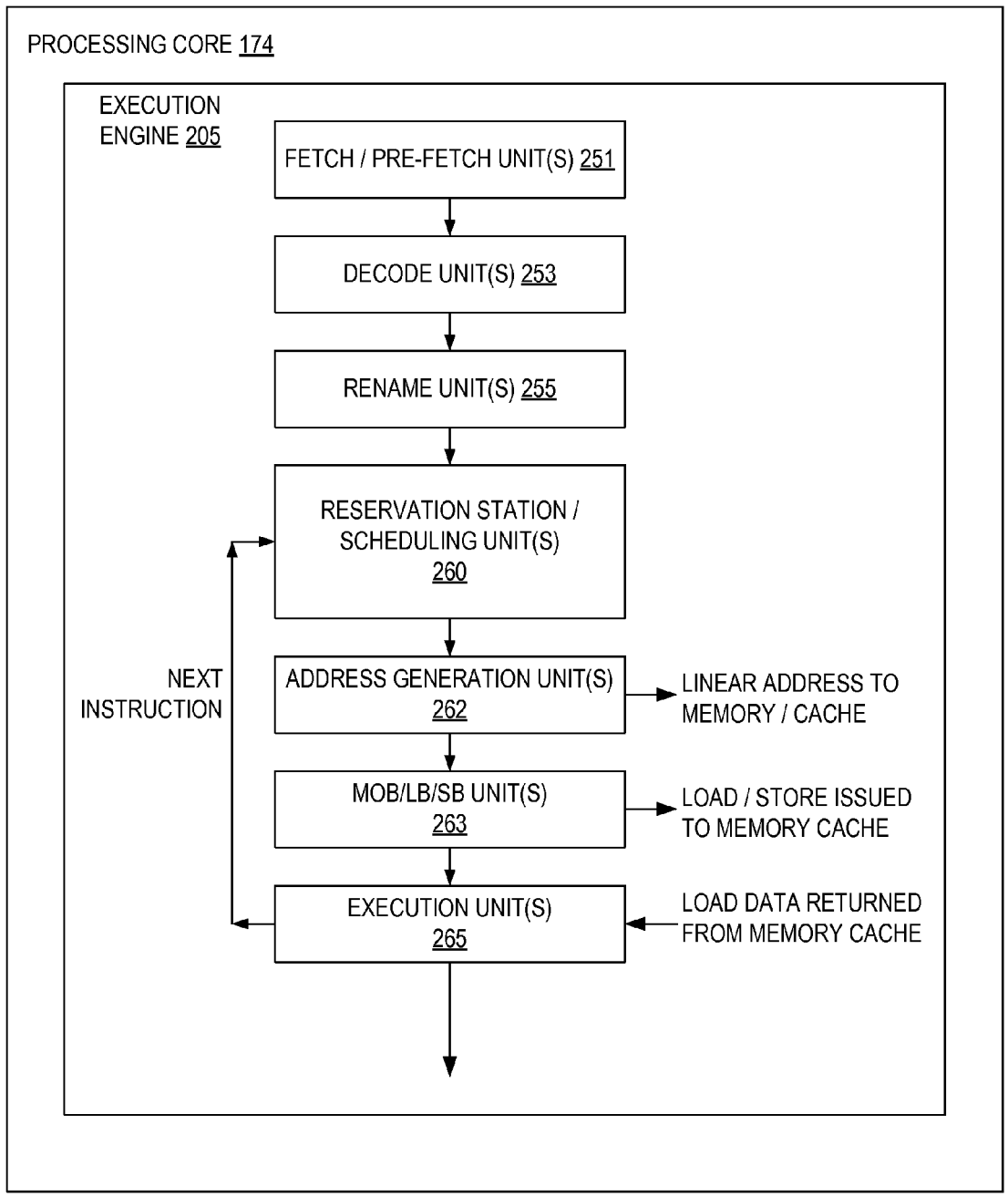
FIG. 2B illustrates a processor used in conjunction with at least one embodiment.

FIG. 2B illustrates an out-of-order execution core. In one embodiment, execution core 205 includes all or some of the elements of front end 204 and execution engine 206 of processing core 274. In at least one embodiment, pending loads may be speculatively issued to a memory address before other older pending store operations according to a prediction algorithm, such as a hashing function. In at least one embodiment, execution core 205 includes a fetch/prefetch unit 251, a decoder unit 253, one or more rename units 255 to assign registers to appropriate instructions or micro-ops, and one or more scheduling/reservation station units 260 to store micro-ops corresponding to load and store operations (e.g., STA micro-ops) until their corresponding target addresses source operands are determined. In some embodiments an address generation unit 262 to generate the target linear addresses corresponding to the load and stores, and an execution unit 265 to generate a pointer to the next operation to be dispatched from the scheduler/reservation stations 260 based on load data returned by dispatching load operations to memory/cache are also included. In at least one embodiment, a memory order buffer (MOB) 263, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores. In other embodiments, processor 270 is an in-order processor.

Figure 3:
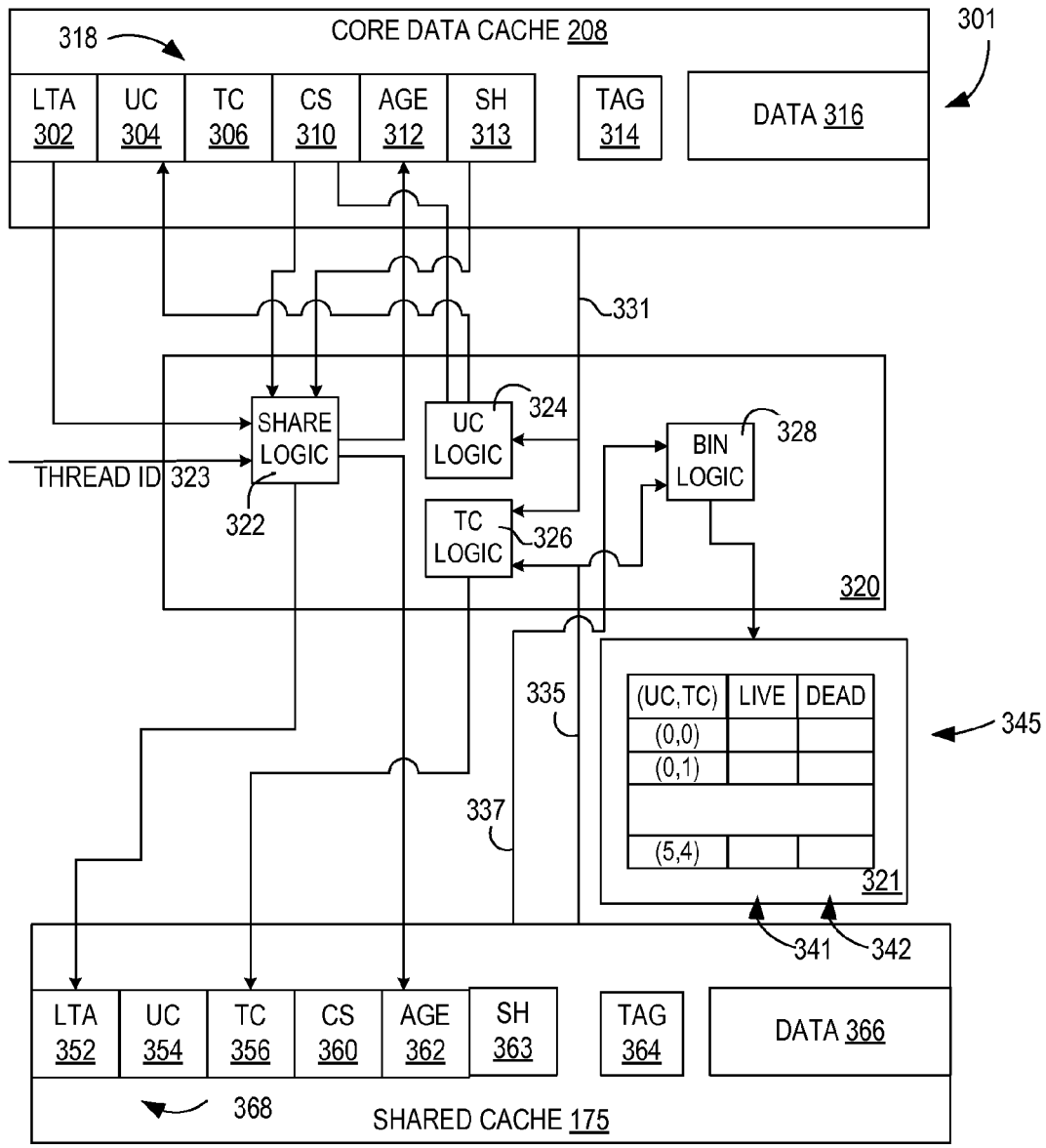
FIG. 3 illustrates a cache memory subsystem used in conjunction with at least one embodiment.

FIG. 3 illustrates a cache memory subsystem used in conjunction with at least one embodiment. In at least one embodiment, cache memory subsystem 300 includes dead block predictor logic 320. In some embodiments, dead block predictor logic 320 includes share logic 322, UC logic 324, TC logic 326, and bin logic 328. The FIG. 3 illustration of dead block predictor logic 320 does not include detail of any address decoding associated with the illustrated logic. In some embodiments, instances of dead block predictor logic 320 may be included with each set or entry of a cache memory. In other embodiments, the signals from the elements of dead block predictor logic 320 are routed through address decoding circuitry (not depicted) to the appropriate cache block. This routing of share logic information, UC logic signals, and TC signals is not illustrated in an effort to maintain clarity of focus on the block features.

In at least one embodiment, a cache block 301 from core data cache 208 and a cache block 351 from shared cache 175 are included. In some embodiments, core data cache block 301 includes cache data 316, an associated cache tag 314, and block status indicators 318. In an analogous manner, in some embodiments, cache block 351 in shared cache 175 includes cache data 366, a corresponding cache tag 364, and block status indicators 368.

In at least one embodiment, block status indicators 318 include an LTA bit 302, a UC field 304, a TC field 306, a coherency state (CS) field 310, a recently used field, referred to herein simply as age field 312, and a shared bit 313. Similarly, in some embodiments, the block status indicators 368 of cache block 351 include an LTA bit 352, a UC field 354, a TC field 356, a CS field 360, a recently used field, referred to herein simply as age field 362, and a shared bit 363. Although in some embodiments, core cache blocks and shared cache blocks having substantially the same set of block status indicators are included, the core cache block status indicators 318 may differ from the shared cache block status indicators 368 in other embodiments.

In some embodiments, LTA bit 302 indicates the last thread to allocate the block in the shared cache. In at least one embodiment, although LTA bit 302 may be included in the block status indicators 318 of core cache block 301, the value of LTA bit 302 is determined at the time a block is evicted from core data cache 208 and allocated in a non-inclusive cache, or updated in an inclusive cache. In at least one embodiment, in which the LTA bit 302 is retained when the block is recalled to core data cache 208, accommodates embodiments in which shared cache 175 is exclusive of or noninclusive of core data cache 208. If shared cache (LLC) 175 is inclusive of core data cache 208, it may be permissible to omit LTA bit 302 from the block status indicators 318 of core data cache 208.

In at least one embodiment, the LTA information, whether referring to LTA bit 302 in core cache block 301 or LTA bit 352 in shared cache 175, is useful in conjunction with shared bit 313 to indicate whether the corresponding block has been accessed by more than one thread during its cache memory lifecycle. In some embodiments, during its cache memory lifecycle, a block may move between shared cache 175 and core data cache 208. If a core data cache block is recalled from shared cache 175 by a first thread and then gets evicted from core data cache 208 back to shared cache 175, the block may, in some embodiments, be recalled by a second thread later. In this situation, the TC may, in at least one embodiment, indicate two distinct trips from shared cache 175 to core data cache 208, but the information would be inaccurate with respect to any single thread. In at least one of the thread-aware embodiments illustrated herein, the detection of the block as a shared block through the use of LTA bit 352 and/or LTA bit 302 would result.

In at least one embodiment, when the block was evicted from core data cache 208 of a first processing core, LTA bit 352 in shared cache 175 was written with a value indicating the first processing core as the core that allocated the block in shared cache 175, i.e., the core that last evicted the block. In some embodiments, as illustrated in FIG. 3, share logic 322 receives thread ID signal 323 from an execution pipe 206 or other source indicating the thread that is currently executing. In some embodiments, thread ID information may be used to record last to allocate information in LTA bit 302. In embodiments where there is a 1:1 correspondence between executing threads and processing cores, share logic 322 may simply record an identifying number of the core data cache 208 in lieu of a thread indicator.

In at least one embodiment, share logic 322 also receives CS 310. In some embodiments, when an eviction occurs, CS 310 transitions to invalid and share logic 322 may record thread ID signal 323 or processor core information (not depicted) in UC 304 or provide the information to shared cache 175 for storage in LTA bit 352. In addition, in some embodiments, share logic 322 receives LTA bit 352 from shared cache 175. From this information, share logic 322 may, in some embodiments, determine that the previous value of LTA bit 352 differs from the thread ID signal 323 of the currently executing thread, or the core data cache 208 allocating the block in shared cache 175 and asserts the shared bit 313 in core data cache 208 as well as the shared bit 363 in shared cache 175. In these embodiments, a block is permanently identified as a shared block, via CS bit 310 in cache block 301 or CS 360 in shared block 351 when it is determined that two different core caches, i.e., two or more different threads, have accessed the block in their respective cores. Thus, some embodiments may identify a block as shared even if that block was never valid in more than one core cache at any given moment in its cache memory lifecycle.

In at least one embodiment, cache memory subsystem 300 gives shared blocks preferential treatment with respect to eviction from shared cache 175. In some embodiments, this preference is achieved, at least in part, by assigning shared blocks an age field 312 that reduces the probability of the cache block being evicted with respect to other blocks. In at least one embodiment, share logic 322 sets age field 312 with the maximum age used by the cache memory subsystem for incrementing recency-based selection and eviction policies.

In at least one embodiment, the dead block predictor logic 320 further includes UC logic 324. In at least one embodiment, UC logic 324 receives a hit/miss signal 331 from core data cache 208 indicating a tag access that hits or misses in core data cache 208. In addition, UC logic 324 receives CS bit 310 in some embodiments. In some embodiments, if UC logic 324 detects a cache hit for a block that is valid as indicated by CS bit 310, UC logic 324 increments UC field 304 in core data cache 208.

In some embodiments, dead block predictor logic 320 further includes TC logic 326. In at least one embodiment, TC logic 326 receives hit miss signal 331 from core data cache 208 and a hit/miss signal 335 from shared cache 175. In some embodiments, when a cache access generates a miss in core data cache 208 and a hit in shared cache 175, the block will be recalled from shared cache 175 to core data cache 208, constituting a new trip, and TC logic 326 will increment the TC field 356 in shared cache 175.

In some embodiments, bin logic 328 is included to control information stored in a cache access bin table 321. In at least one embodiment, bin logic 328 performs or maintains cache access bin table 321 by updating live and dead block count fields 341 and 342 for each cache access bin entry 345. Dead block predictor logic 320 updates, in some embodiments, information in cache access bin table 321 when a change in a block's (UC, TC) pair is detected and when a block is evicted from shared cache 175.

In at least one embodiment, when UC logic 324 or TC logic 326 increments the UC or TC bits of a cache block, the block moves from one cache access bin to another. For purposes of this discussion, a cache access bin corresponds to a (UC, TC) pair. If a (0, 1) block, i.e., a block that has a (UC, TC) pair of (0, 1), is accessed while valid in core data cache 208, the block's UC value will, in some embodiments, increment and the block will effectively relocate from cache access bin (0, 1) to cache access bin (1, 1). Cache access block table 321 may then be updated by bin logic 328 to decrement the live count for cache access bin (0, 1) and increment the live block count for cache access bin (1, 1). Similarly, when a cache block 351 is evicted from a shared cache 175, the eviction is reported to bin logic 328 via an eviction signal 337 and bin logic 328 will increment the dead block count field 342 for the applicable cache access bin entry 345 and decrement the applicable live block count field 341 for the same cache access bin entry 345. To illustrate, if any (1, 1) cache block is evicted from shared cache 175, bin logic 328 updates bin table 321 by decrementing the live block count field 341 for cache access block (1, 1) and incrementing the dead block count field 342 for the same cache access bin (1, 1) in some embodiments.

FIG. 4 illustrates a dead block database used in conjunction with at least one embodiment. In at least one embodiment, cache access bin table 321 includes more information about the cache access state of the large cache when each block that was evicted died. In some embodiments, cache access database 321 includes a first table 401 that include a detailed profile of the bins counts at the time of death (TOD) of each block evicted from shared cache 175. In some embodiments, cache access table 321 includes a first table 401 containing a log of entries corresponding to each block that was recently evicted from L2 where each entry include tag/address information 412 and the bin 414 of the evicted block. In at least one embodiment, each entry 411 further records a live block count and dead block count across all bins at the time of the evicted blocks death.

In at least one embodiment, a second table 402 includes the cumulative live block count 420 and dead block count 422 for each bin. In at least one embodiment, eviction policy for cache memory subsystem 300 is influenced by the cache access bin live block count and the account values. Qualitatively, a cache access bin that has a dead block count significantly larger than its live block count but which also has a substantial live block count may be the best candidate for a dead block prediction. However, while predicting dead blocks based solely on live block count and dead counts may be desirable for its relative simplicity, other embodiments may store and analyze more detailed profiling of the cache access bin status when they block is predicted. Thus, although FIG. 3 and FIG. 4 illustrate cache accessible information that may be used in conjunction with at least one embodiment and that may be preserved and employed to improve the selection or prediction of a dead block, it will be appreciated that other embodiments may include more, less, or different cache access data.

Figure 5:
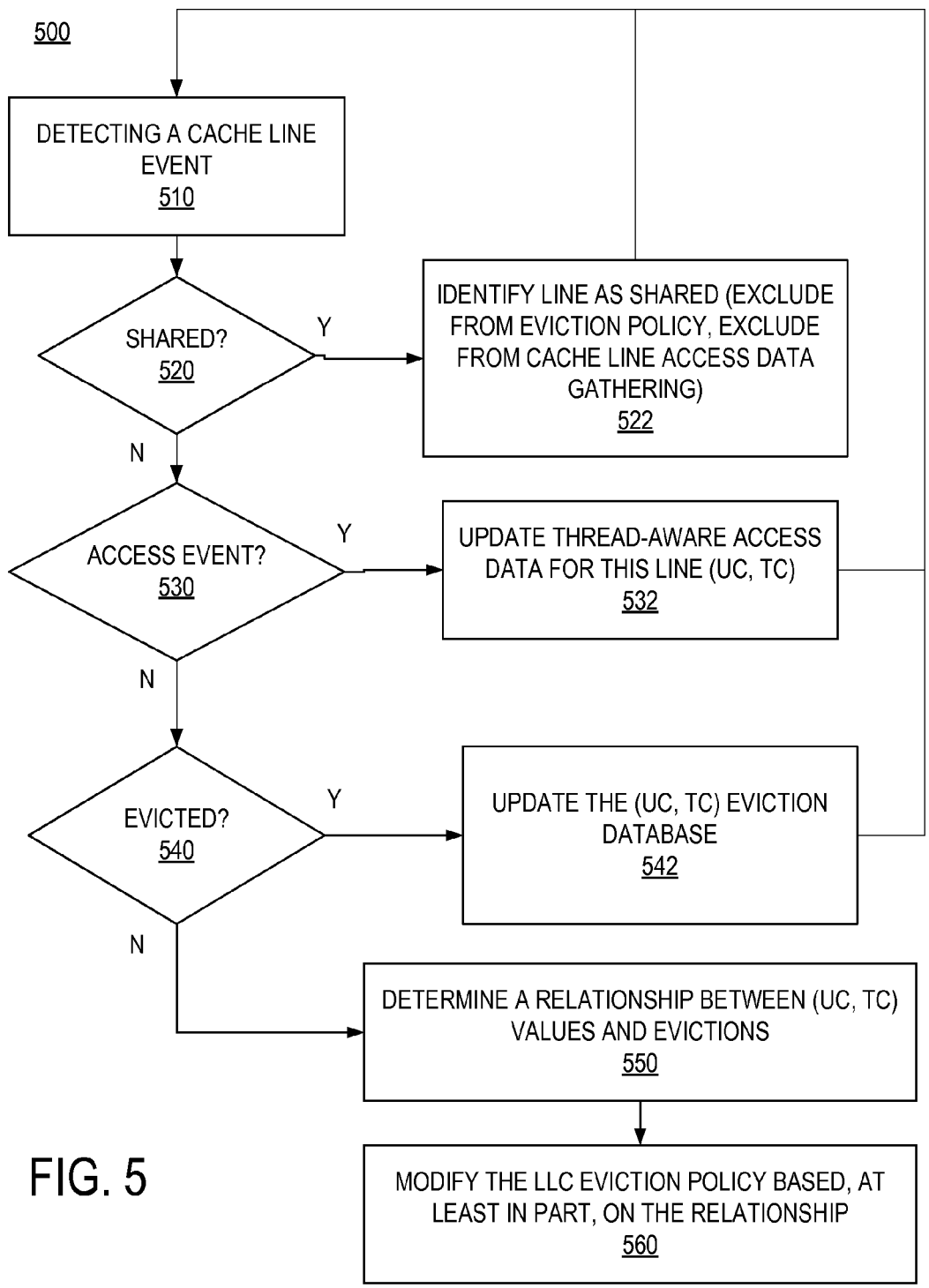
FIG. 5 illustrates one embodiment of a cache block eviction method used in conjunction with at least one embodiment.

FIG. 5 illustrates one embodiment of a cache block eviction method used in conjunction with at least one embodiment. Although shown in a particular sequence or order, unless otherwise stated, the order of the actions can be modified. FIG. 5 is a flow diagram illustrating selected elements of an embodiment of method 500 for implementing a cache replacement scheme for cooperative workloads on chip-level multi-processor caches. In some embodiments, method 500 may be executed, at least in part, to distinguish shared blocks from private blocks in a cache replacement scheme for cooperative workloads on chip-level multi-core caches.

In at least one embodiment, method 500 is initiated by the cache controller of a processor in a multi-processor system to detect a cache block event (operation 510). In some embodiments, a predetermined shared cache eviction policy is utilized to determine how many times a cache block is accessed in a private cache and how many times the cache block is recalled from a shared cache to the private cache during a tenure of the cache block. In at least one embodiment, operation 520 determines if the cache block is a shared block. In some embodiments, if a determination is made that the cache block is a shared block, the block is identified (operation 522) as a shared block and is excluded from the eviction policy and from cache block access data gathering, and returns to operation 510 to monitor the cache for cache block events. Otherwise, operation 520 continues on, in some embodiments, to operation 530 where a determination is made of an unshared access event, such as a TC or UC. In some embodiments, if a determination is made that an event occurred, the thread-aware access data is updated (operation 532) for this cache block with the (UC, TC) value and then continues to operation 510 to monitor the caches for cache block events. In some embodiments, if a determination is made that no access event occurred, operation 530 continues onto operation 540 where a determination is made if a transaction requiring a cache block eviction from the shared cache will occur. In at least one embodiment, if an eviction occurs, the eviction database is updated (operation 542) with the (UC, TC) value and continues to operation 510 to monitor the cache for cache block events. If an eviction does not occur in operation 540, then, in some embodiments, a determination is made between the relationship between (UC, TC) values and evictions (operation 550) and then proceeds to modify the shared cache eviction policy (operation 560) based, at least in part, on the relationship determined in operation 550.

FIG. 6 illustrates one embodiment of a cache method. Although shown in a particular sequence or order, unless otherwise stated, the order of the actions can be modified. FIG. 6 is a flow diagram illustrating selected elements of an embodiment of method 600 for implementing a cache replacement scheme for cooperative workloads on chip-level multi-processor caches. In some embodiments, method 600 may be executed, at least in part, to deprioritize shared cache blocks in a cache replacement scheme for cooperative workloads on chip-level multi-core caches.

In some embodiments, method 600 is initiated by the cache controller of a processor in a multi-processor system to maintain LLC eviction policies (operation 610) based, at least in part, on a relationship determined by the (UC, TC) values and the eviction occurrence. In at least one embodiment, method 600 continues to assign a higher priority to shared block over non-shared or private blocks so that the shared blocks are less likely to be evicted (operation 620). In some embodiments, prioritizing a shared block includes assigning a maximum predetermined age to the block before insertion in the LLC. In at least one embodiment, the method continues where the LLC eviction victims are chosen using the LLC eviction policy (operation 630). In some embodiments, in operation 640, the thread-aware dead block predictors continue to make decisions for private blocks.

Figure 7:
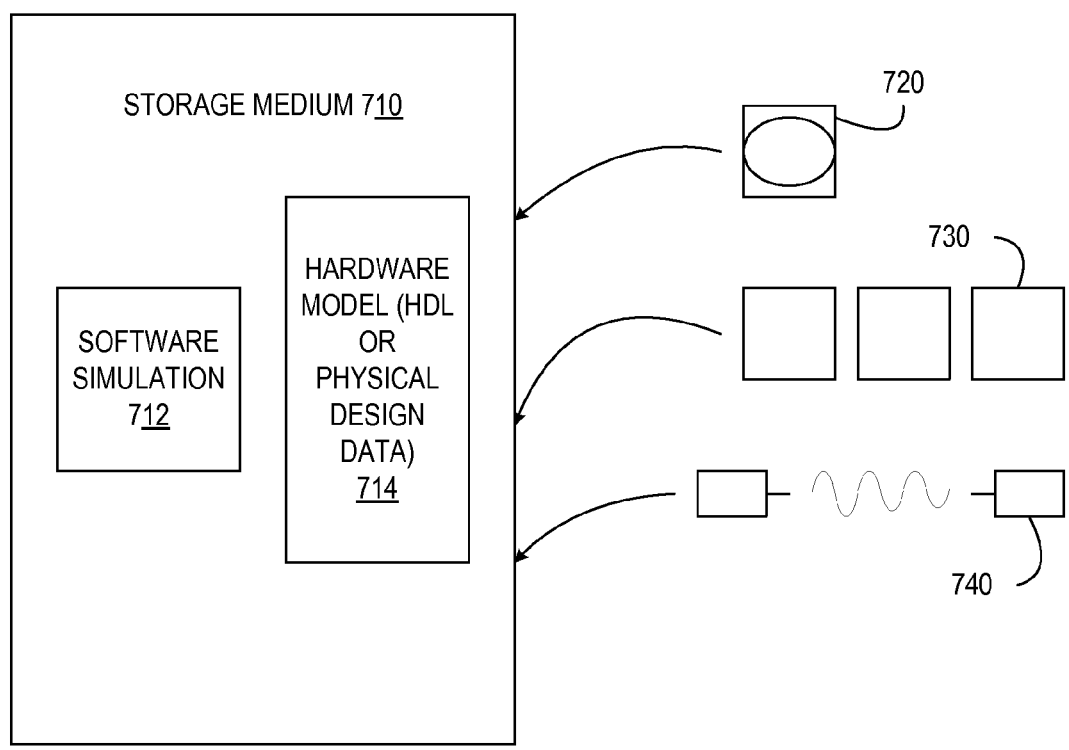
FIG. 7 illustrates a representation for simulation, emulation and fabrication of a design implementing the disclosed techniques.

FIG. 7 illustrates a simulation, emulation and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, the hardware model 714 may be stored in a storage medium 710 such as a computer memory so that the model may be simulated using simulation software 712 that applies a particular test suite to the hardware model 714 to determine if it indeed functions as intended. In some embodiments, the simulation software 712 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 740 modulated or otherwise generated to transmit such information, a memory 730, or a magnetic or optical storage 720 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

The following pertain to further embodiments:

Embodiment 1 is a processor comprising: a plurality of processing cores; a cache memory subsystem, comprising: a plurality of core caches, each of the core caches corresponding to one of the processing cores; a shared cache, common to each of the processing cores; trip count (TC) logic to increment a thread-aware trip count for a block recalled from the shared cache to a first core cache; use count (UC) logic to increment a UC for a block responsive to each access of the block in the first core cache; shared block logic to set a shared block bit for a block accessed by multiple core caches; bin logic to maintain live block counts and dead block counts for each bin, wherein: a bin corresponds to a (UC, TC) pair; a live block count indicates a number of valid, unshared blocks associated with a bin; and a dead block count indicates a number of blocks evicted from a corresponding bin; and eviction logic to select a shared cache block to evict, from a plurality of eviction candidates, based on at least one of: trip count values, UC values, live bin counts, and dead bin counts.

In embodiment 2, the bin logic included in the subject matter of embodiment 1 is optionally operable to: increment a live block count for a first bin and decrement a live block count for a second bin responsive to detecting a change in (UC, TC) pair for a cache block; and increment a dead block count for a third bin responsive to detecting an eviction of a cache block associated with the third bin.

In embodiment 3, the subject matter of embodiment 1 can optionally include last-to-allocate (LTA) logic to set an LTA field for a block responsive to a first thread allocating the block in the shared cache, wherein the LTA field identifies the first thread.

In embodiment 4, the shared block logic included in the subject matter of embodiment 3 can optionally include sets the shared block bit responsive to detecting the LTA field identifying a second thread.

In embodiment 5, the subject matter of embodiment 4 can optionally include age logic to set maximum value in an age field of the block responsive to detecting the setting of the shared block bit.

In embodiment 6, the eviction logic included in the subject matter of embodiment 5 is optionally operable to select the block to evict based on a value in the age field of a block responsive to identifying multiple eviction candidates from the same bin.

Embodiment 7 is a cache memory eviction method comprising: maintaining thread-aware cache access data per cache block in a cache memory, wherein the cache access data is indicative of a number of times a cache block is accessed by a first thread; and associating a cache block with one of a plurality of bins based on cache access data values of the cache block; selecting a cache block to evict from a plurality of cache block candidates based, at least in part, upon the bins with which the cache block candidates are associated.

In embodiment 8, the cache memory included in the subject matter of embodiment 7 can optionally include a shared cache in a cache memory hierarchy, and the cache access data included in the subject matter of embodiment 7 can optionally include trip count (TC) data indicative of a number of times a cache block is forwarded from the shared cache to a core cache.

In embodiment 9, the cache access data included in the subject matter of embodiment 8 can optionally include use count (UC) data indicative of a number of times the cache block was accessed by the first thread while residing in the core cache.

In embodiment 10, the plurality of cache access bins included in the subject matter of embodiment 9 can optionally include bins corresponding each unique (UC, TC) pair.

In embodiment 11, the subject matter of embodiment 10 can optionally include maintaining a database of live block counts and dead block counts for each bin and the selecting of the cache block to evict included in the subject matter of embodiment 10 is optionally based, at least in part, upon the live block counts and dead block counts for the cache access.

In embodiment 12, the subject matter of embodiment 7 can optionally include maintaining a shared block status per cache block, and the shared block status included in the subject matter of embodiment 8 is optionally indicative of whether a second thread accessed the cache block.

In embodiment 13, the subject matter of embodiment 12 can optionally include excluding shared cache blocks from the bins responsive to identifying the cache block as a shared cache block.

In embodiment 14, the selecting the cache block to evict included in the subject matter of embodiment 12 can optionally include excluding from the plurality of cache block candidates, shared cache blocks.

In embodiment 15 the maintaining the shared block status included in the subject matter of embodiment 12 can optionally include maintaining last thread data indicative of a last thread to allocate the cache block.

In embodiment 16, the subject matter of embodiment 12 can optionally include assigning a maximum value to an age attribute of a shared cache block allocated in the shared cache responsive to evicting the shared cache block from the core cache.

Embodiment 17 is a computer system comprising: a processor including a core region including a plurality of processing cores, each processing core including a core cache, and a shared cache shared among the core caches; a memory controller integrated in an uncore region of the processor; and an I/O hub connected to the processor; wherein the processor includes dead block prediction logic to: maintain shared block bits indicative of when a block is shared; maintain cache access data indicative of a number of times an unshared block is accessed; associate unshared blocks with bins based on their cache access data; maintain live block counts and dead block counts for each bin; and select blocks to evict based on the cache access data, the live block counts, and the dead block counts.

In embodiment 18, the dead block prediction logic included in the subject matter of embodiment 17 is optionally operable to select a block to evict from a set of candidate blocks comprising all valid blocks associated with a first set in the shared cache.

In embodiment 19, the cache access data included in the subject matter of embodiment 17 can optionally include use count data indicative of a number of times an unshared block is accessed in the core cache and trip count data indicative of a number of times an unshared block is recalled from the shared cache to a first core cache.

In embodiment 20, the dead block prediction logic included in the subject matter of embodiment 17 is optionally operable to evict unshared blocks preferentially to shared blocks.

In embodiment 21, the subject matter of embodiment can optionally include: first storage to store an operating system; an I/O hub to interface to the processor; and an I/O device to interface to the I/O hub, wherein the I/O device is selected from: a touchscreen controller, a solid state drive, and a sensor.

In embodiment 22, the operating system included in the subject matter of embodiment 21 can optionally include: processor-executable resume module instructions to reduce latency associated with transitioning out of a power conservation state: and processor-executable connect module instructions to maintain a currency of a dynamic application during the power conservation state.

In embodiment 23, the subject matter of any one of embodiments 1 or 2 can optionally include last-to-allocate (LTA) logic to set an LTA field for a block responsive to a first thread allocating the block in the shared cache, wherein the LTA field identifies the first thread.

In embodiment 24, the cache memory eviction method included in the subject matter of any one of embodiments 8, 9, 10, or 11, can optionally include maintaining a shared block status per cache block, wherein the shared block status is indicative of whether a second thread accessed the cache block.

In embodiment 25, the subject matter of any one of embodiments 17, 18, 19, or 20 can optionally include: first storage to store an operating system; an I/O hub to interface to the processor; and an I/O device to interface to the I/O hub, wherein the I/O device is selected from: a touchscreen controller, a solid state drive, and a sensor.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor, comprising:
    a plurality of processing cores;
    a cache memory subsystem, comprising:
        a plurality of core caches, each of the core caches corresponding to one of the processing cores;
        a shared cache, common to each of the processing cores;
        trip count (TC) logic to update a thread-aware trip count for a block recalled from the shared cache to a first core cache;
        use count (UC) logic to update a UC for a block responsive to each access of the block in the first core cache;
        shared block logic to set a shared block bit for a block accessed by multiple core caches;
        bin logic to maintain live block counts and dead block counts for each bin, wherein:
            a bin corresponds to a (UC, TC) pair;
            the live block count to indicate a number of valid, unshared blocks associated with a bin; and
            the dead block count to indicate a number of blocks evicted from a corresponding bin; and
        eviction logic to select a shared cache block to evict, from a plurality of eviction candidates, based on at least one of: trip count values, UC values, live bin counts, and dead bin counts.

2. The processor of claim 1, wherein the bin logic is operable to:
    increment a live block count for a first bin and decrement a live block count for a second bin responsive to detection of a change in (UC, TC) pair for a cache block; and
    increment a dead block count for a third bin responsive to detection of an eviction of a cache block associated with the third bin.

3. The processor of claim 1, further comprising:
    last-to-allocate (LTA) logic to set an LTA field for a block responsive to a first thread allocation of the block in the shared cache, wherein the LTA field identifies the first thread.

4. The processor of claim 3, wherein the shared block logic is to set the shared block bit responsive to detection that the LTA field identifies a second thread.

5. The processor of claim 4, further comprising:
    age logic to set maximum value in an age field of the block responsive to detection that the shared block bit is set.

6. The processor of claim 5, wherein the eviction logic is operable to select the block to evict based on a value in the age field of a block responsive to identification of multiple eviction candidates from the same bin.

7. A method, comprising:
    maintaining thread-aware cache access data per cache block in a cache memory, wherein the cache access data is indicative of a number of times a cache block is accessed by a first thread;
    maintaining a shared block status per cache block, wherein the shared block status is indicative of whether a second thread accessed the cache block;
    associating a cache block with one of a plurality of bins based on cache access data values of the cache block, and excluding shared cache blocks from the bins responsive to identifying the cache block as a shared cache block;
    selecting a cache block to evict from a plurality of cache block candidates based, at least in part, upon the bins with which the cache block candidates are associated.

8. The method of claim 7, wherein the cache memory comprises a shared cache in a cache memory hierarchy, and wherein the cache access data includes trip count (TC) data indicative of a number of times a cache block is forwarded from the shared cache to a core cache.

9. The method of claim 8, wherein the cache access data includes use count (UC) data indicative of a number of times the cache block was accessed by the first thread while residing in the core cache.

10. The method of claim 9, wherein the plurality of bins include bins corresponding to each unique (UC, TC) pair.

11. The method of claim 10, further comprising:
maintaining a database of live block counts and dead block counts for each bin, wherein the selecting of the cache block to evict is based, at least in part, upon the live block counts and dead block counts in the database.

12. The method of claim 7, wherein selecting the cache block to evict includes, excluding from the plurality of cache block candidates, shared cache blocks.

13. The method of claim 7, wherein maintaining the shared block status includes maintaining last thread data indicative of a last thread to allocate the cache block.

14. The method of claim 7, further comprising: assigning a maximum value to an age attribute of a shared cache block allocated in the shared cache responsive to evicting the shared cache block from the core cache.

15. A computer system, comprising:
a processor including a core region including a plurality of processing cores, each processing core including a core cache, and a shared cache shared among the core caches;
a memory controller integrated in an uncore region of the processor; and
an I/O hub connected to the processor; wherein the processor includes dead block prediction logic to:
maintain shared block bits indicative of when a block is shared by a first thread and a second thread;
maintain cache access data indicative of a number of times an unshared block is accessed;
associate unshared blocks with bins based on their cache access data;
maintain live block counts and dead block counts for each bin; and
select unshared blocks to evict based on the cache access data, the live block counts, and the dead block counts.

16. The computer system of claim 15, wherein the dead block prediction logic is operable to select a block to evict from a set of candidate blocks comprising all valid blocks associated with a first set in the shared cache.

17. The computer system of claim 15, wherein the cache access data includes use count data indicative of a number of times an unshared block is accessed in the core cache and trip count data indicative of a number of times an unshared block is recalled from the shared cache to a first core cache.

18. The computer system of claim 15, wherein the dead block prediction logic is operable to evict unshared blocks preferentially to shared blocks.

19. The computer system of claim 15, further comprising:
first storage to store an operating system;
an I/O device to interface to the I/O hub, wherein the I/O device is selected from: a touchscreen controller, a solid state drive, and a sensor.

20. The computer system of claim 19, wherein the operating system includes:
processor-executable resume module instructions to reduce latency associated with transitioning out of a power conservation state: and
processor-executable connect module instructions to maintain a currency of a dynamic application during the power conservation state.

* * * * *

UNITED STATES PATENT AND TRADEMARK OFFICE
CERTIFICATE OF CORRECTION

PATENT NO.       : 9,195,606 B2
APPLICATION NO.  : 13/976248
DATED            : November 24, 2015
INVENTOR(S)      : Ragavendra Natarajan et al.

It is certified that error appears in the above-identified patent and that said Letters Patent is hereby corrected as shown below:

On The Title Page, Item (72) "Jayesh Guar" should be --Jayesh Gaur--.

Signed and Sealed this
Twenty-second Day of March, 2016

Michelle K. Lee
*Director of the United States Patent and Trademark Office*